United States Patent
Robinson et al.

(10) Patent No.: US 7,856,967 B2
(45) Date of Patent: Dec. 28, 2010

(54) METHOD OF DETERMINING AMBIENT PRESSURE FOR FUEL INJECTION

(75) Inventors: James S. Robinson, Delaware, OH (US); Jared C. Vanderhoof, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 237 days.

(21) Appl. No.: 12/174,923

(22) Filed: Jul. 17, 2008

(65) Prior Publication Data

US 2010/0011849 A1 Jan. 21, 2010

(51) Int. Cl.
*F02D 41/18* (2006.01)

(52) U.S. Cl. .................... 123/677; 73/114.37

(58) Field of Classification Search ........... 123/677, 123/518, 519, 325, 478, 493; 73/114.31, 73/114.37
See application file for complete search history.

(56) References Cited

U.S. PATENT DOCUMENTS

| | | | |
|---|---|---|---|
| 4,495,921 A | 1/1985 | Sawamoto | |
| 4,497,297 A | 2/1985 | Daniel et al. | |
| 4,582,031 A | 4/1986 | Janetzke et al. | |
| 4,590,563 A | 5/1986 | Matsumura et al. | |
| 4,600,993 A | 7/1986 | Pauwels et al. | |
| 4,633,842 A | 1/1987 | Ikeda et al. | |
| 4,696,275 A | 9/1987 | Kushi et al. | |
| 4,831,537 A | 5/1989 | Scarnera et al. | |
| 4,907,557 A | 3/1990 | Ishii et al. | |
| 4,986,244 A | 1/1991 | Kobayashi et al. | |
| 5,053,968 A | 10/1991 | Uchinami | |
| 5,230,318 A | 7/1993 | Iwamoto | |
| 5,427,083 A | 6/1995 | Ahern | |
| 5,494,018 A | 2/1996 | Black et al. | |
| 6,082,334 A | 7/2000 | Shomura et al. | |
| 6,109,244 A | 8/2000 | Yamamoto et al. | |
| 6,366,847 B1 | 4/2002 | Sun et al. | |
| 6,546,915 B2 | 4/2003 | Machida et al. | |
| 6,626,154 B1 | 9/2003 | Kanno | |
| 6,705,296 B2 | 3/2004 | Horstmann et al. | |
| 6,804,995 B2 * | 10/2004 | Kawano | 73/114.39 |
| 6,863,057 B2 | 3/2005 | Kawano | |
| 6,983,646 B2 | 1/2006 | Sawada et al. | |
| 7,293,556 B2 | 11/2007 | Baldauf et al. | |
| 7,320,307 B2 | 1/2008 | Trask et al. | |
| 7,481,101 B2 * | 1/2009 | Matsubara et al. | 73/114.39 |
| 2007/0246004 A1 | 10/2007 | Matekunas et al. | |

FOREIGN PATENT DOCUMENTS

| | | |
|---|---|---|
| JP | 57-108422 | 7/1982 |
| JP | 60-032953 | 2/1985 |

* cited by examiner

*Primary Examiner*—Erick Solis
(74) *Attorney, Agent, or Firm*—Plumsea Law Group, LLC; Mark E. Duell

(57) ABSTRACT

A method of controlling a motor vehicle is disclosed. The method can be used to determine an ambient pressure value without the use of an ambient pressure sensor. The ambient pressure value can be used for controlling a set of fuel injectors. The method can include provisions for adjusting the ambient pressure value to correct for errors introduced by engine wear and other factors.

20 Claims, 11 Drawing Sheets

METHOD OF DETERMINING AMBIENT PRESSURE FOR FUEL INJECTION

BACKGROUND OF THE INVENTION

1. Field of the Invention

The present invention relates to motor vehicles and in particular to a method of determining ambient pressure for a fuel injection system.

2. Description of Related Art

A fuel injector can include an ambient pressure sensor to measure the ambient pressure. However, since such a sensor can add cost and manufacturing complexity for a motor vehicle, methods for determining ambient pressure without an ambient pressure sensor have also been proposed.

Kawano (U.S. Pat. No. 6,863,057) teaches a fuel vapor treatment system. The treatment system includes a fuel tank and a canister that are fluidly coupled together by a purge pipe. The canister is provided with an atmospheric release port that can be closed using a drain cut valve. Kawano also teaches an absolute pressure sensor that measures both the pressure inside the piping and the atmospheric pressure. Kawano teaches that a controller sets the pressure value detected by the absolute pressure sensor as the true atmospheric pressure when the drain cut valve is open.

Sun et al. (U.S. Pat. No. 6,366,847) is directed to a method of estimating barometric pressure in an engine control system. Sun teaches a method of determining a barometric pressure value for wide open throttle conditions as a function of a manifold absolute pressure value. The barometric pressure is estimated using engine speed, throttle position, manifold absolute pressure and, optionally, mass airflow as inputs.

The related art does not teach provisions for adjusting calculations of ambient pressure as the operating conditions of the engine change over time due to wear and other factors. There is a need in the art for a system that includes provisions for correcting the calculated ambient pressure according to the varying state of the engine.

SUMMARY OF THE INVENTION

A method of determining ambient pressure for a fuel injection system is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method of controlling a motor vehicle, comprising the steps of: determining if a fuel tank is in equilibrium with an environment of the motor vehicle; receiving information from a fuel tank pressure sensor when the fuel tank is in equilibrium with the environment; determining an ambient pressure value from the information received from the fuel tank pressure sensor; and controlling one or more systems of the motor vehicle according to the ambient pressure value.

In another aspect, the step of determining if the fuel tank is in equilibrium with the environment includes a step of determining if a vent shut valve is open.

In another aspect, the step of determining if the fuel tank is in equilibrium with the environment includes a step of determining if an engine of the motor vehicle is running.

In another aspect, the method further includes a step of receiving information from an intake pressure sensor.

In another aspect, the information received from the intake pressure sensor is used to adjust the ambient pressure value.

In another aspect, the invention provides a method of controlling a motor vehicle, comprising the steps of: determining an ambient pressure value, the ambient pressure value being used to control at least one system of the motor vehicle; retrieving a preselected parameter associated with a first engine state; receiving information from at least one sensor; determining a current parameter associated with a second engine state according to information received from the at least one sensor, wherein the second engine state is different from the first engine state; comparing the current parameter with the preselected parameter; determining an ambient pressure correction factor; and using the ambient pressure correction factor to adjust the ambient pressure value.

In another aspect, the step of receiving information from a sensor is preceded by a step of creating a predetermined engine event.

In another aspect, the predetermined engine event is a fuel cut deceleration event.

In another aspect, the at least one sensor includes an intake pressure sensor and an engine speed sensor.

In another aspect, the step of receiving information is preceded by a step of controlling a throttle to open to a predetermined position.

In another aspect, the at least one sensor is configured to determine an air leakage value.

In another aspect, the air leakage value is an idle amount for parasitic losses.

In another aspect, the step of receiving information occurs passively without creating a predetermined engine event.

In another aspect, the invention provides a method of controlling a motor vehicle, comprising the steps of: determining if an engine of the motor vehicle is running; receiving information from a plurality of sensors when the engine is running, wherein the plurality of sensors includes a coolant temperature sensor; determining an ambient pressure value according to the information received from the plurality of sensors; and controlling a fuel injection system according to the ambient pressure value.

In another aspect, the plurality of sensors further includes an intake pressure sensor, a throttle angle sensor, an air temperature sensor and an engine speed sensor.

In another aspect, the plurality of sensors further includes a fuel tank pressure sensor.

In another aspect, the method includes a step of determining the ambient pressure value directly from information received from the intake pressure sensor when the engine is not running.

In another aspect, the method includes a step of determining the ambient pressure value directly from information received from the fuel tank pressure sensor when the engine is not running.

In another aspect, the ambient pressure value is determined using a look-up table.

In another aspect, the ambient pressure value is calculated using a function.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
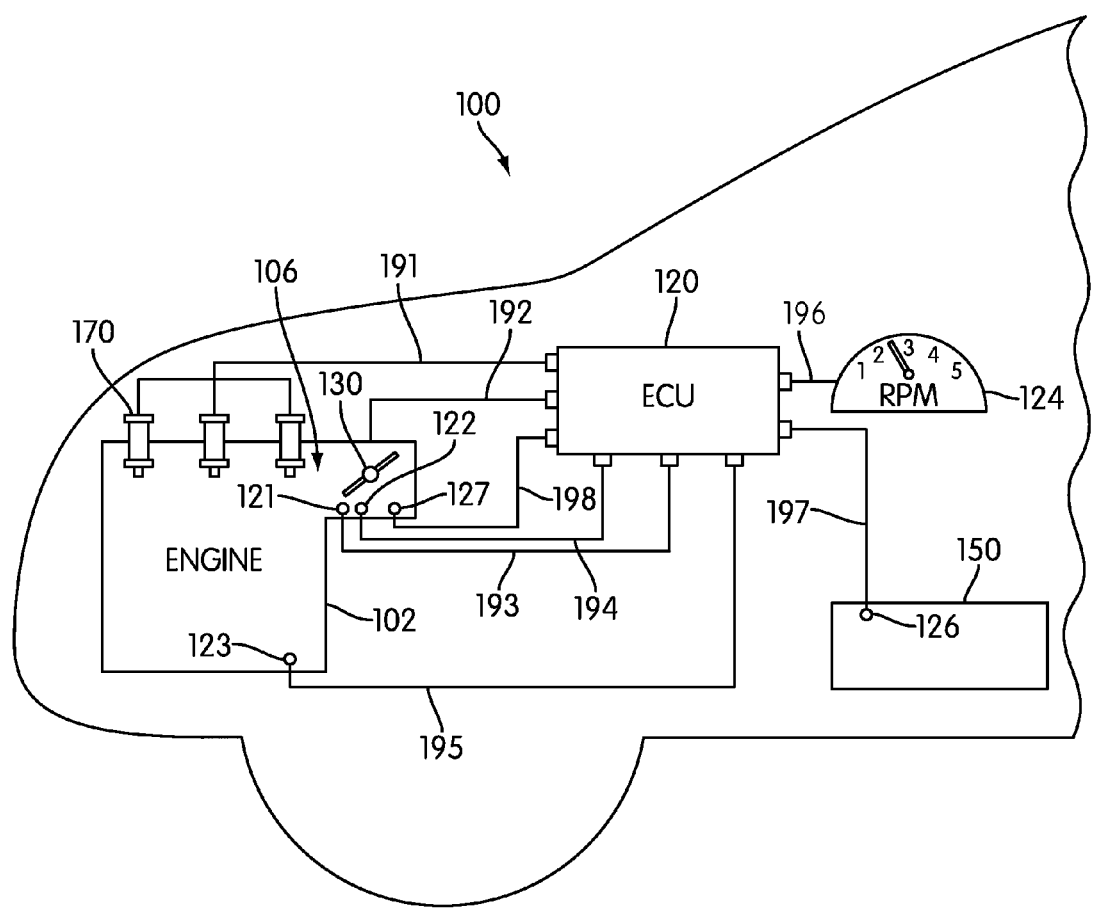
FIG. 1 is a schematic view of an embodiment of a motor vehicle.

FIG. 1 is a schematic view of an embodiment of motor vehicle 100. For purposes of illustration, motor vehicle 100 is shown as a sports utility vehicle; however it should be understood that in other embodiments motor vehicle 100 could be any type of motor vehicle including, but not limited to, cars, trucks, vans, minivans, SUVs, motorcycles, scooters, boats, personal watercraft, and aircraft.

Motor vehicle 100 includes engine 102. Engine 102 may be any type of engine that is capable of producing torque. In addition, motor vehicle 100 and engine 102 may be associated with other components that can assist in propelling motor vehicle 100. For clarity, only some components of motor vehicle 100 are shown in this schematic illustration. It should be understood that in other embodiments, additional components may be used with motor vehicle 100.

Engine 102 may be associated with one or more fuel injectors that are configured to deliver fuel to engine 102. In this embodiment, engine 102 includes fuel injector set 170 that comprises three fuel injectors. In other embodiments, more or less than three fuel injectors may be associated with engine 102. Each fuel injector comprising fuel injector set 170 is associated with, and configured to deliver fuel to, a cylinder within engine 102.

Engine 102 may also be associated with throttle 130. Throttle 130 may be configured to regulate the amount of air entering engine 102. In some cases, throttle 130 may be associated with an intake manifold of engine 102. By opening to various throttle positions, throttle 130 may control the amount of air entering engine 102 and thereby help control the speed of engine 102. Throttle 130 may be further associated with a throttle pedal. Using this arrangement, a driver of motor vehicle 100 may depress the throttle pedal to direct throttle 130 to open and allow air to enter engine 102.

Motor vehicle 100 can include provisions for storing fuel. In some embodiments, motor vehicle 100 can include fuel tank 150. Generally, fuel tank 150 can be disposed in any portion of motor vehicle 100. In one embodiment, fuel tank 150 can be disposed on a bottom portion of motor vehicle 100. Fuel tank 150 can be associated with one or more provisions for delivering fuel from fuel tank 150 to engine 102.

Motor vehicle 100 can include provisions for monitoring conditions of engine 102 or other components of motor vehicle 100. In some embodiments, motor vehicle 100 can include one or more sensors that are configured to detect various operating conditions of a motor vehicle. Examples of various sensors that can be provided in motor vehicle 100 include, but are not limited to, pressure sensors, temperature sensors, speeds sensors, knock sensors, noise sensors, as well as other types of sensors.

In this embodiment, motor vehicle 100 may include one or more pressure sensors. In particular, motor vehicle 100 includes intake pressure sensor 121. Intake pressure sensor 121 is configured to measure the pressure of air disposed within intake manifold 106. Motor vehicle 100 may also include fuel tank pressure sensor 126. Fuel tank pressure sensor 126 is configured to measure the pressure of air disposed within fuel tank 150.

Motor vehicle 100 can also include one or more temperature sensors. In particular, motor vehicle 100 can include air temperature sensor 122. In some cases, air temperature sensor 122 can be configured to measure the temperature of the air within intake manifold 106. In other cases, air temperature sensor 122 can be configured to measure the temperature of air in another portion of engine 102. Likewise, motor vehicle 100 can include coolant temperature sensor 123 that is configured to measure the temperature of the coolant fluid associated with engine 102. In other embodiments, motor vehicle 100 can include additional temperature sensors for determining ambient air temperature, cylinder temperature, fuel line temperature, as well as temperatures of other portions of a motor vehicle.

Motor vehicle 100 can also include provisions for sensing the speed of engine 102. In this embodiment, motor vehicle 100 may include engine speed sensor 124. For illustrative purposes, engine speed sensor 124 is shown as a tachometer. However, engine speed sensor 124 could be associated with any portion of a motor vehicle or an engine. For example, in some embodiments, engine speed sensor 124 could be a crank angle sensor of some kind.

Motor vehicle 100 can include provisions for monitoring the position of throttle 130. In this embodiment, throttle 130 may be associated with throttle angle sensor 127. Generally, throttle angle sensor 127 may be any sensor configured to determine the current position of a throttle valve. Throttle angle sensor 127 may be configured to measure the current throttle angle with respect to the closed and open positions of the throttle valve.

Motor vehicle 100 may include provisions for communicating, and in some cases controlling, the various components associated with motor vehicle 100. In some embodiments, motor vehicle 100 may be associated with a computer or similar device. In the current embodiment, motor vehicle 100 may be associated with electronic control unit 120, hereby referred to as ECU 120. In an embodiment, ECU 120 may be configured to communicate with, and/or control, engine 102 as well as additional components of motor vehicle 100 not associated with engine 102.

ECU 120 may be configured to communicate with components of engine 102. ECU 120 may communicate and control fuel injector set 170 via first circuit 191. In particular, ECU 120 may initiate and terminate fuel cuts with fuel injector set 170 via first circuit 191.

In some embodiments, throttle 130 may be mechanically linked to a throttle pedal. In one embodiment, ECU 120 may also include provisions for electronically controlling throttle 130. In particular, ECU 120 may communicate and control throttle 130 via second circuit 192. With this arrangement, ECU 120 may direct throttle 130 to open and close to various throttle positions via second circuit 192 according to various parameters, including the position of a throttle pedal. In some cases, this arrangement may be known as a "drive-by-wire" system.

ECU 120 is also in communication with various sensors. In this embodiment, ECU 120 may be in communication with intake pressure sensor 121, air temperature sensor 122, coolant temperature sensor 123, engine speed sensor 124, fuel tank pressure sensor 126 and throttle angle sensor 127 via third circuit 193, fourth circuit 194, fifth circuit 195, sixth circuit 196, seventh circuit 197 and eighth circuit 198, respectively.

The circuits discussed here may comprise one or more connections. In some cases, the connections could be electrical wires or printed circuits. In other cases, the connections could be wireless connections of some kind. In still other cases, the connections could include both electrical wires and wireless connections. It should be understood that in embodiments with additional sensors or components, additional circuits may be used for connection with ECU 120.

Generally, ECU 120 may be configured to communicate with additional components of engine 102 not shown in the Figures. In other embodiments, multiple electronic control units may be used. In these other embodiments, each control unit may be associated with one or more components and in communication with one another.

In some cases, a motor vehicle may include provisions for determining one or more properties of ambient air. The term "ambient air" as used throughout this detailed description and in the claims refers to region of air associated with an environment of a motor vehicle. Ambient air may be associated with various properties such as pressures, temperatures, densities and other properties. In some cases, these properties can differ from air disposed within an engine, a fuel tank or any other system of a motor vehicle. Furthermore, it may be necessary to determine one or more properties of the ambient air in order to properly operate one or more systems of the motor vehicle.

In embodiments where fuel injectors are controlled by an ECU, the ECU can include provisions for determining an ambient pressure in order to properly calculate injection timing and/or injection quantity. In particular, in embodiments without an ambient pressure sensor, the ECU may include provisions for determining an ambient pressure value using information from other sensors of the motor vehicle.

Figure 2:
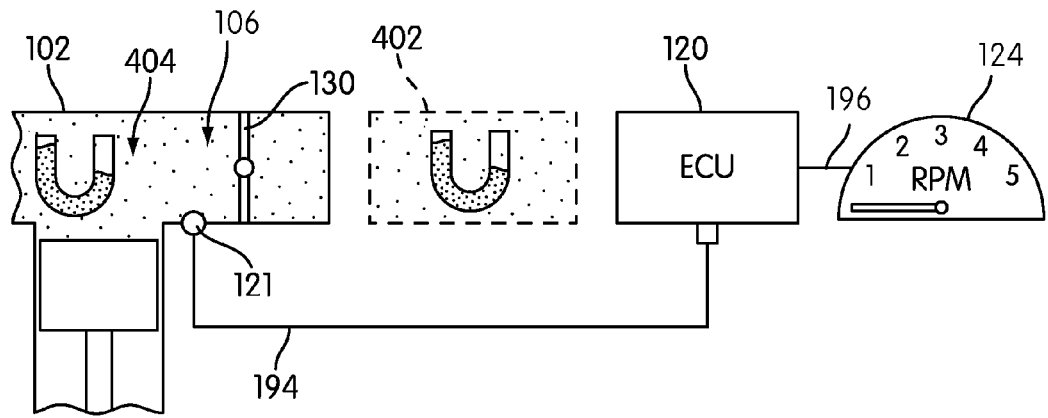
FIG. 2 is a schematic view of an embodiment of an intake manifold.

FIG. 2 illustrates a schematic view of an embodiment of engine 102. Engine 102 may be associated with intake air region 404, which is a region disposed within intake manifold 106 of engine 102. In this embodiment, ambient air region 402 is disposed outside of engine 102. For purposes of illustration, ambient air region 402 is illustrated adjacent to engine 102. In other embodiments, ambient air region 402 could be located adjacent to another portion of the motor vehicle.

An ECU can include provisions for determining an ambient pressure value according to information received from an intake manifold pressure sensor. Referring to FIG. 2, engine 102 may include intake pressure sensor 121, as previously discussed. Intake pressure sensor 121 is in communication with ECU 120 via circuit 194. With this arrangement, intake pressure sensor 121 can be configured to monitor the pressure of air within intake air region 404.

In this embodiment, engine 102 is in a non-running condition, as indicated by engine speed sensor 124. When engine 102 is in this non-running condition, the air within intake air region 404 may be in equilibrium with ambient air region 402. In other words, the pressure of intake air region 404 is substantially equal to the ambient pressure of ambient air region 402. At this point, ECU 120 may receive information from intake pressure sensor 121. This information may be used to determine the pressure of intake air region 404. Furthermore, since intake air region 404 and ambient air region 402 may be in equilibrium, the pressure of intake air region 404 can be set as the ambient pressure value. With this arrangement, the ambient pressure value can be used to control fuel injection as previously discussed.

In embodiments including a fuel tank pressure sensor, the ambient pressure can be measured directly using information received from the fuel tank pressure sensor. In particular, whenever the air disposed inside the fuel tank is in approximate equilibrium with the ambient air, the fuel tank pressure sensor can be used to determine the ambient pressure.

Figure 3:
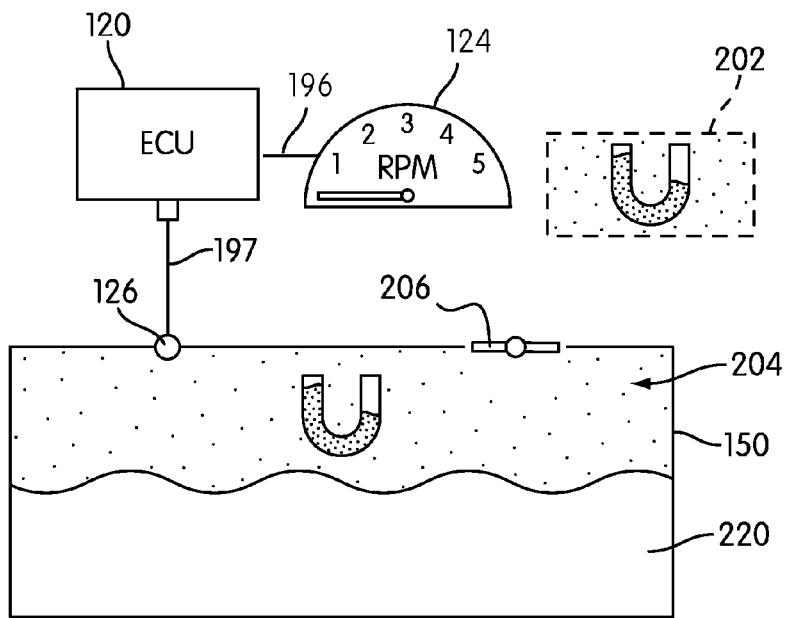
FIG. 3 is a schematic view of an embodiment of a fuel tank.
Figure 4:
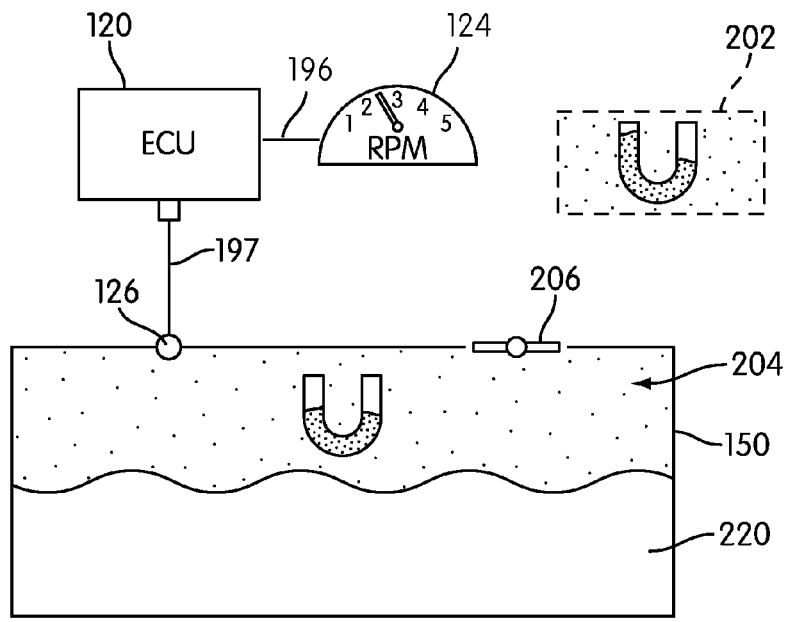
FIG. 4 is a schematic view of an embodiment of a fuel tank.
Figure 5:
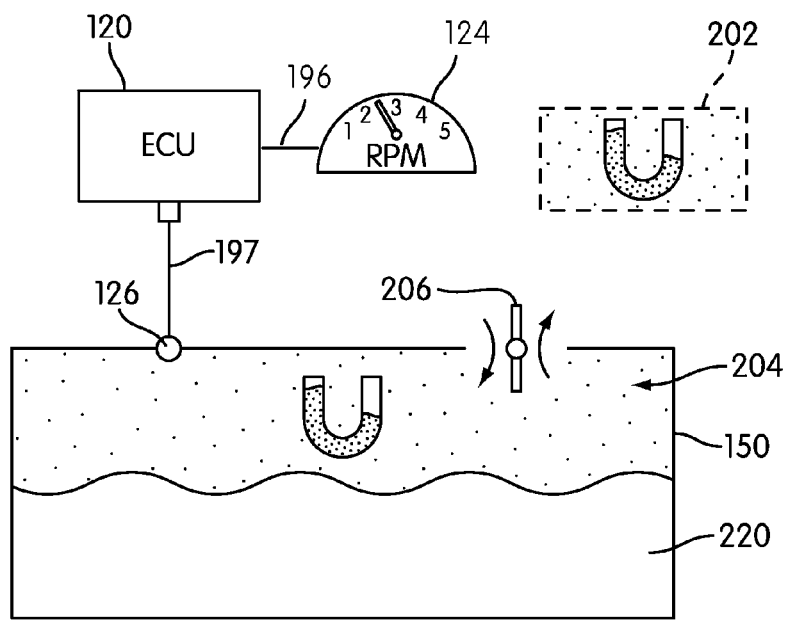
FIG. 5 is a schematic view of an embodiment of a fuel tank.

FIGS. 3-5 illustrate schematic views of an embodiment of a fuel tank configured with a fuel tank pressure sensor. Referring to FIG. 3, fuel tank 150 is configured to store fuel 220. For purposes of clarity, fuel tank 150 is shown schematically with a generally rectangular cross sectional shape in this embodiment. However, in other embodiments, fuel tank 150 could have any other shape. Also, in different embodiments, fuel tank 150 could be configured to store any type of fuel. Examples of different fuels that could be stored in fuel tank 150 include, but are not limited to, biofuels and fossil fuels, as well as other types of fuels.

In some cases, a fuel tank can include provisions for allowing air to pass into and/or out of the fuel tank. For example, in this embodiment, fuel tank 150 includes vent shut valve 206. Generally, vent shut valve 206 could be any type of valve that may be used to control venting from fuel tank 150. Examples of valves include, but are not limited to, gates, plugs, globes, checks, butterflies, diaphragms, balls, solenoid, needle, hydraulic as well as other types of valves. Vent shut valve 206 may be configured with an open position and a closed position. FIGS. 3 and 4 illustrate vent shut valve 206 in a closed position. In this closed position, air and/or vapors are prevented from passing from fuel tank 150 to ambient air region 202. FIG. 5 illustrates vent shut valve 206 in an open position. In this open position, air and/or vapor from fuel tank 150 can pass from fuel tank 150 to ambient air region 202. In other words, when vent shut valve 206 is open fuel tank 150 is in fluid communication with ambient air 202.

As previously discussed, fuel tank 150 can include fuel tank pressure sensor 126 that is in communication with ECU 120 via circuit 197. Fuel tank pressure sensor 126 can monitor the pressure within fuel tank air region 204 of fuel tank 150. Generally, fuel tank air region 204 can be associated with any mixture of gasses disposed within fuel tank 150. In some cases, fuel tank air region 204 can include vapors from fuel 220. However, fuel tank air region 204 can also include gases from other sources that have entered fuel tank 150.

When engine 102 is in a non-running condition, the pressure of fuel tank air region 204 is generally in equilibrium with ambient air region 202. In particular, the pressures of fuel tank air region 204 and ambient air region 202 may be substantially similar even when vent shut valve 206 is closed. In some cases, ECU 120 can be configured to receive information from fuel tank pressure sensor 126 when the engine is not running. Since the pressures of fuel tank air region 204 and ambient air region 202 are substantially similar, the ECU may determine the ambient pressure directly by measuring the pressure of fuel tank air region 204.

Referring to FIG. 4, the engine is operating at approximately 2500 RPM, as indicated by engine speed sensor 124. When the engine is running, the pressure of fuel tank air region 204 can vary. In particular, when vent shut valve 206 is in a closed position, fuel tank air region 204 and ambient air region 202 may not be in equilibrium. However, as vent shut valve 206 is opened, as seen in FIG. 5, air can be exchanged between fuel tank air region 204 and ambient air region 202. At this point, fuel tank air region 204 and ambient air region 202 can be brought into approximate equilibrium. In particular, the pressure of fuel tank air region 204 becomes approximately equal to the pressure of ambient air 202. Furthermore, since fuel tank air region 204 and ambient air region 202 may be in equilibrium, the pressure of fuel tank air region 204 can be set as the ambient pressure value. With this arrangement, the ambient pressure value can be used to control fuel injection as previously discussed.

Figure 6:
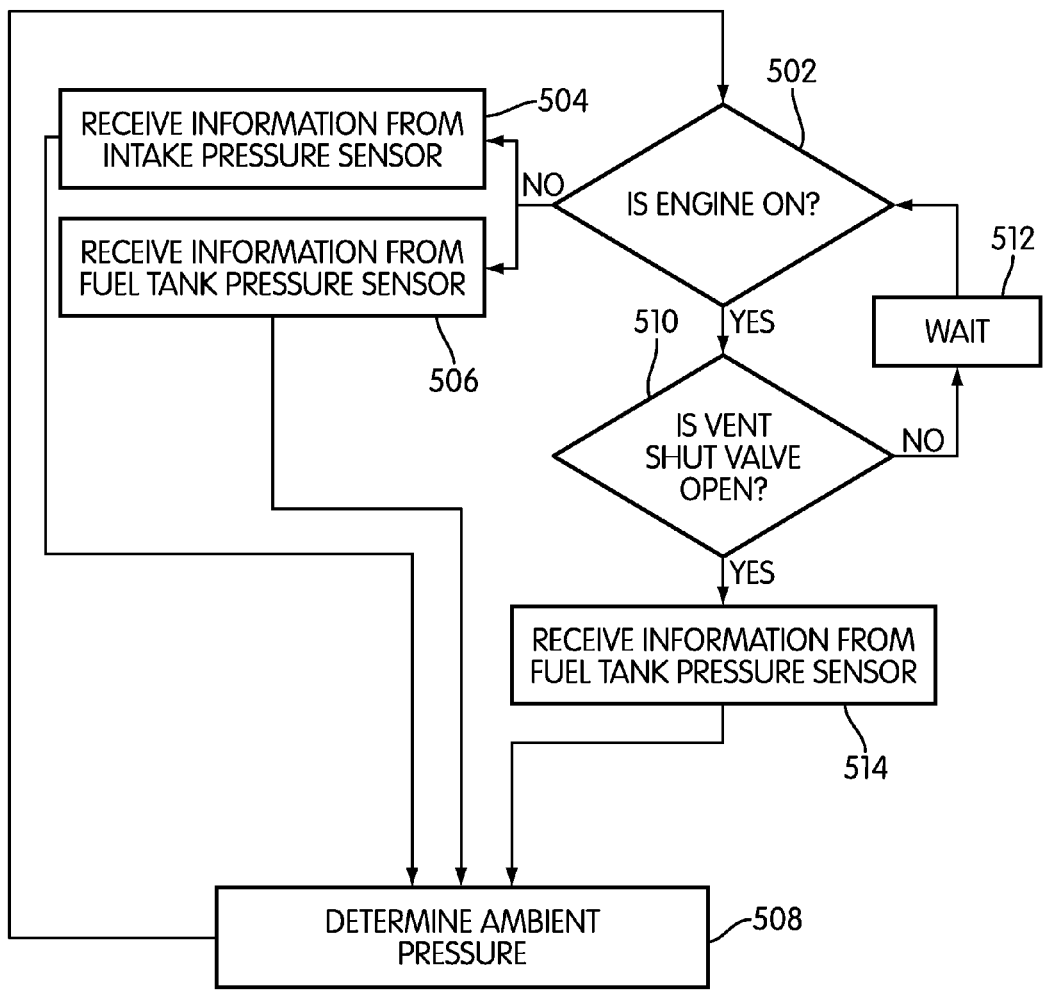
FIG. 6 is an embodiment of a process for directly determining an ambient pressure value.

FIG. 6 illustrates an embodiment of a process for determining an ambient pressure value directly. In particular, the following method includes steps for determining the ambient pressure according to a fuel tank pressure sensor and/or an intake pressure sensor. In this embodiment, the following steps are performed by an ECU; however in some embodiments these steps may be performed by additional systems or devices associated with a motor vehicle and an engine.

Initially, during step 502, the ECU may determine if the engine is operating. If the engine is not operating, the ECU may proceed to step 504 or step 506. In particular, in embodiments with an intake pressure sensor, the ECU can proceed to step 504. At this point, the ECU may receive information from the intake pressure sensor in order to determine the pressure of the air in the intake manifold. Following step 504, the ECU can proceed to step 508. During step 508, the ECU may determine the ambient pressure according to the information received from the intake pressure sensor. In particular, since the engine is not operating, the intake air pressure is approximately equal to the ambient pressure.

In embodiments with a fuel tank pressure sensor, the ECU may proceed to step 506. At this point, the ECU may receive information from the fuel tank pressure sensor. Following step 506, the ECU can proceed to step 508. During step 508, the ECU may determine the ambient pressure according to information received from the fuel tank pressure sensor. In particular, since the engine is not operating, the fuel tank air pressure is approximately equal to the ambient pressure.

It should be understood that in other embodiments, the ECU could receive information from both the intake pressure sensor and the fuel tank pressure sensor in order to determine an ambient pressure value. For example, in another embodiment, the ECU could determine two ambient pressure values, associated with information received from the intake pressure sensor and the fuel tank pressure sensor, respectively, and use these two values to determine an effective ambient pressure value.

If, during step 502, the ECU determines that the engine is in an operating, or running, condition, then the ECU may proceed to step 510. During step 510, the ECU may determine if the vent shut valve, which is associated with the fuel tank, is open. If the vent shut valve is not open, the ECU may proceed to step 512. During step 512, the ECU may wait for the vent shut valve to open. Following step 512, the ECU may return to step 502.

If, during step 510, the ECU determines that the vent shut valve is open, the ECU may proceed to step 514. During step 514, the ECU can receive information from the fuel tank pressure sensor. Following step 514, the ECU may proceed to step 508. During step 508, the ECU can determine the ambient pressure according to information received from the fuel tank pressure sensor. In particular, since the vent shut valve is open, the fuel tank pressure is in equilibrium with the ambient air. In other words, the fuel tank air pressure is approximately equal to the ambient air pressure.

In some embodiments, an ECU may include provisions for indirectly determining an ambient pressure value. In some cases, the ECU may be configured to determine an ambient pressure value according to the values of one or more engine parameters. For example, in some embodiments, the ECU may use intake pressure, engine speed, air temperature, coolant temperature and throttle angle to determine an ambient pressure value.

Figure 7:
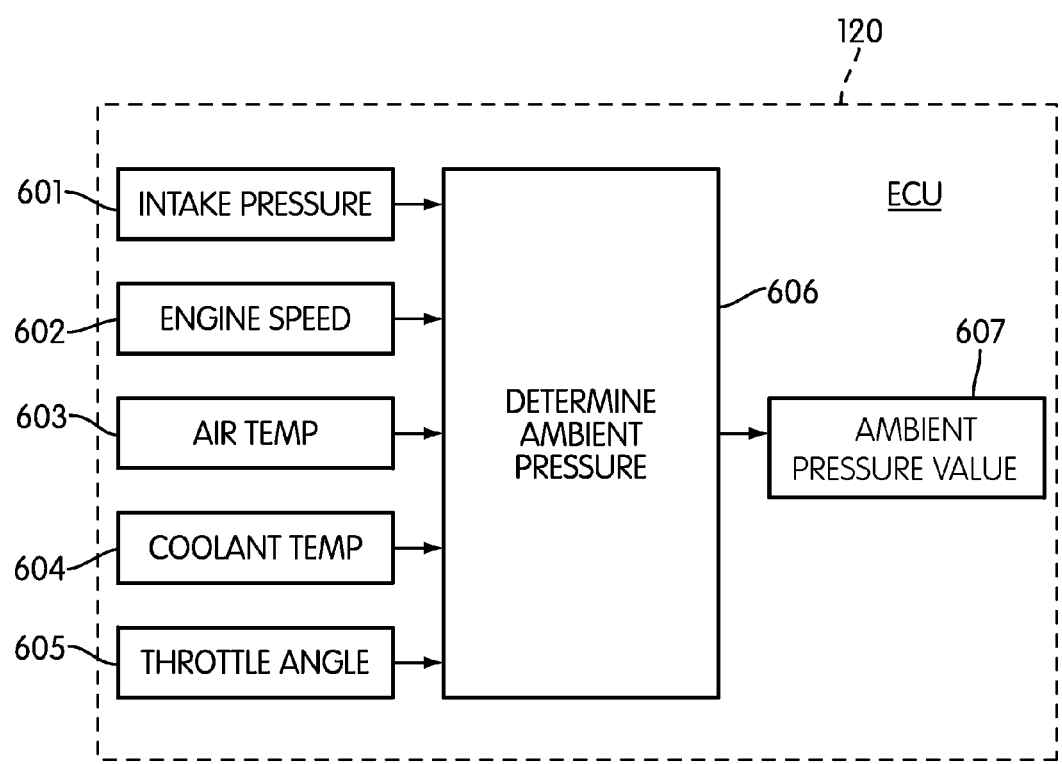
FIG. 7 is a schematic view of an embodiment of a process for indirectly determining an ambient pressure value.

FIG. 7 illustrates a schematic view of an embodiment of a process for indirectly determining an ambient pressure value using various engine parameters when an engine is operating. Referring to FIG. 7, ECU 120 is configured to receive information from a plurality of sensors, as previously discussed. In this embodiment, ECU 120 is configured to receive information related to intake pressure 601, engine speed 602, air temperature 603, coolant temperature 604 and throttle angle 605. It should be understood that ECU 120 is also configured to receive information related to other parameters as well.

In this embodiment, intake pressure 601, engine speed 602, air temperature 603, coolant temperature 604 and throttle angle 605 may be inputs to process 606. Generally, process 606 can be any calculation, method or other type of process for determining ambient pressure according to one or more engine parameters. For example, in one embodiment, process 606 could be a look-up table. The look up table could include stored information relating ambient pressure values with other engine parameters. In some cases, a manufacturer may perform measurements on a test engine using a barometric chamber. The values of different engine parameters may be measured at various ambient pressures and stored in a look-up table.

In another embodiment, process 606 could be a set of calculations. For example, in some cases, the Bernoulli equation may be used to solve for the ambient pressure. In particular, various engine parameters may be used as inputs to the equation. In still other embodiments, other processes for determining the ambient pressure according to various engine parameters can be used.

In some embodiments, the output of process 606 may be ambient pressure value 607. In some cases, ambient pressure value 607 may be used for controlling fuel injection operation. In other cases, ambient pressure value 607 may be used for controlling other systems or components associated with the motor vehicle.

Figure 8:
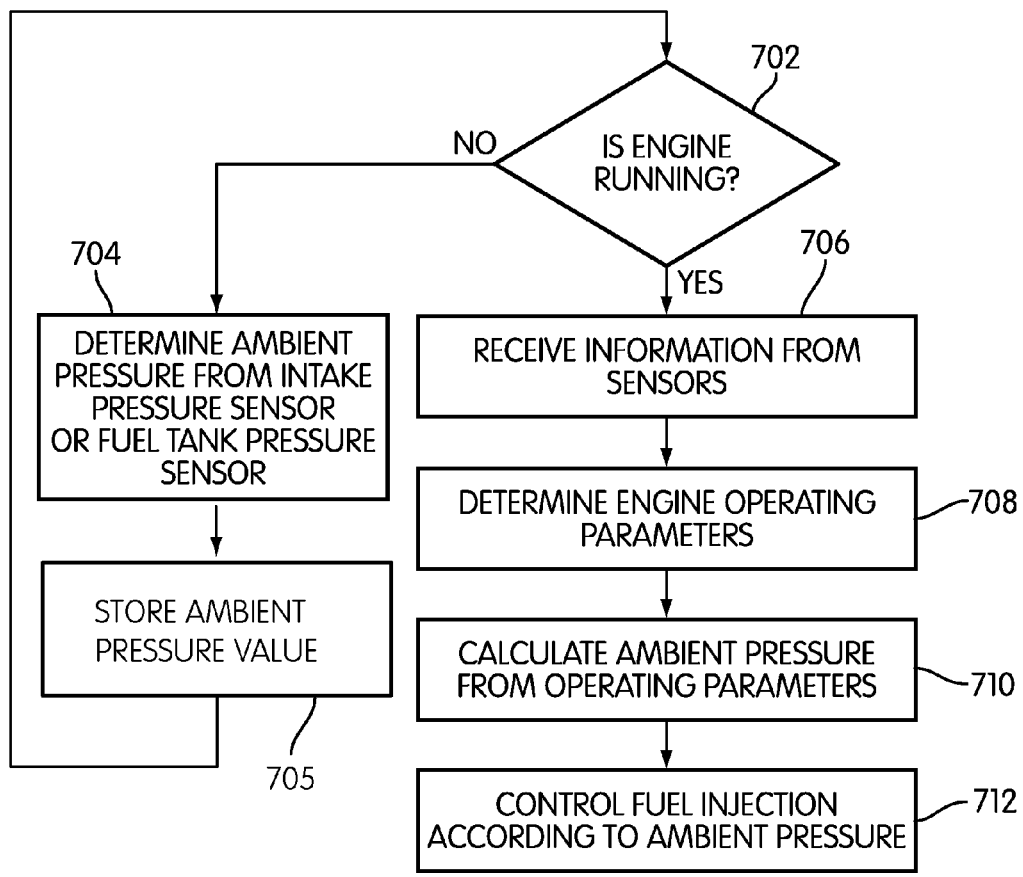
FIG. 8 is an embodiment of a process for indirectly determining an ambient pressure value.

FIG. 8 illustrates an embodiment of a process for indirectly determining an ambient pressure value according to one or more engine parameters. In particular, the following method includes steps for determining the ambient pressure according to a information received from a plurality of sensors. In this embodiment, the following steps are performed by an ECU; however in some embodiments these steps may be performed by additional systems or devices associated with a motor vehicle and an engine.

During step 702, the ECU may determine if the engine is running. If the engine is not running, the ECU may proceed to step 704. During step 704, the ECU can determine the ambient pressure according to information received from the intake pressure sensor and/or the fuel tank pressure sensor. Following step 704, the ECU may store an ambient pressure value during step 705. In some cases, the ECU may store a base ambient pressure value in this manner every time the motor vehicle shuts off. In such cases, the ECU remains on long enough to measure the base ambient pressure just after the engine has been turned off. At this point, the ECU may return to step 702 and determine if the engine has changed to a running condition.

If, during step 702, the ECU determines that the engine is running, the ECU may proceed to step 706. During step 706, the ECU may receive information from one or more sensors. In one embodiment, the ECU may receive information from intake pressure sensor 121, air temperature sensor 122, coolant temperature sensor 123, engine speed sensor 124, fuel tank pressure sensor 126 and throttle angle sensor 127 (see FIG. 1). In another embodiment, the ECU may receive information from only some of these sensors. In still another embodiment, the ECU could receive information from other additional sensors known in the art.

Following step 706, the ECU may proceed to step 708. During step 708, the ECU may determine one or more engine operating parameters according to the information received from the one or more sensors. In one embodiment, the ECU may determine an intake pressure, an engine speed, an air temperature, a coolant temperature and a throttle angle. In another embodiment, the ECU may only determine some of these operating parameters. In still another embodiment, the ECU could determine additional operating parameters that are known in the art.

Following step 708, the ECU may proceed to step 710. During step 710, the ECU may calculate an ambient pressure value from various operating parameters. As previously discussed, this may be accomplished by using a look-up table, a function, a set of calculations or another type of process. In some cases, the ECU may also retrieve the stored ambient pressure value and adjust this value according to the calculated ambient pressure. At this point, the ECU may proceed to step 712. During step 712, the ambient pressure value may be used to control the fuel injector set.

Over time, various factors such as engine wear, tappet clearance, air cleaner dirt, as well as other factors may introduce errors into a method of determining ambient air pressure according to various engine parameters. For example, in some cases, the relationship between ambient air pressure and intake air pressure may change as dirt builds up in an air cleaner of the engine. In other cases, engine wear may change the relationship between ambient air and intake air temperature. In still other cases, the relationship between ambient pressure and other engine parameters may vary with time and use. This change can introduce errors into a calculated ambient pressure value.

The process for indirectly determining an ambient pressure may include provisions for correcting errors in the ambient pressure due to various factors such as engine wear. In some embodiments, the engine may run one or more diagnostic routines to determine an ambient pressure correction factor. In some cases, the engine may initiate a particular predetermined engine event in order to measure various engine parameters and determine a correction factor. The term "predetermined engine event" as used throughout this detailed description and in the claims refers to a particular configuration of an engine that is controlled by the ECU. In other cases, the engine may passively monitor various engine systems in order to determine a correction factor.

Figure 9:
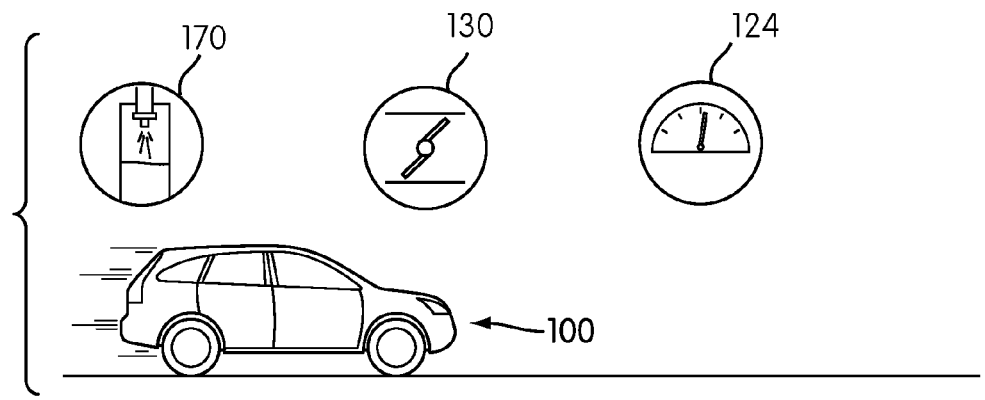
FIG. 9 is a schematic view of an embodiment of a motor vehicle.
Figure 10:
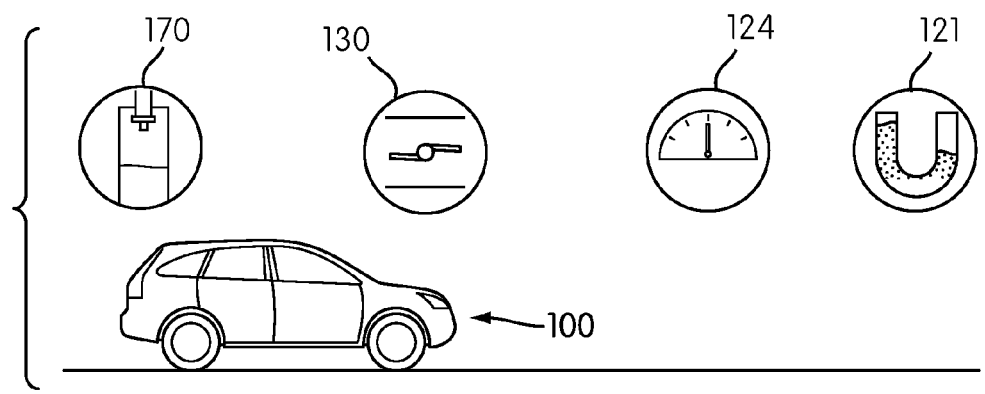
FIG. 10 is a schematic view of an embodiment of a motor vehicle undergoing fuel cut deceleration.
Figure 11:
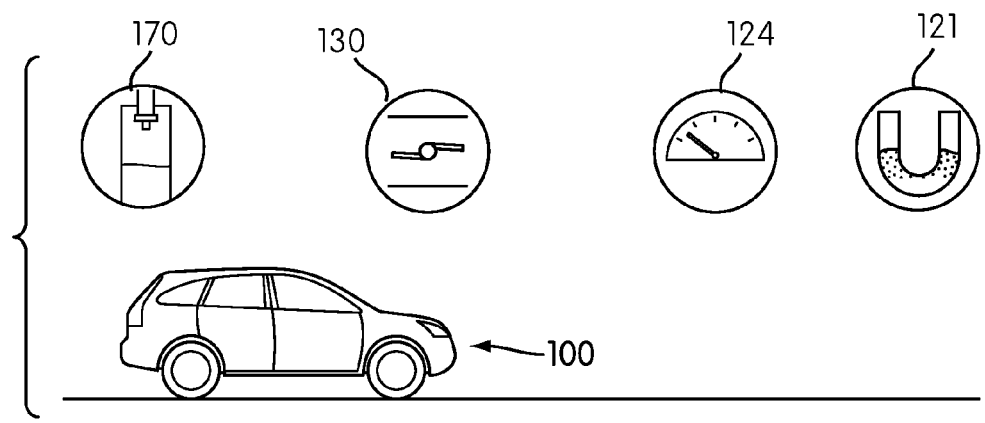
FIG. 11 is a schematic view of an embodiment of a motor vehicle undergoing fuel cut deceleration.

FIGS. 9-11 illustrate schematic views of an embodiment of a motor vehicle undergoing fuel cut deceleration. The term "fuel cut deceleration" as used throughout this detailed description and in the claims refers to an engine event where fuel is cut during operation of a motor vehicle resulting in engine deceleration. Fuel cut decelerations are predetermined engine events that can be useful in providing a motor vehicle with increased fuel efficiency. In some cases, a fuel cut deceleration may occur when a vehicle is speed is greater than the engine speed. In order to increase fuel efficiency, the lock-up clutch of a torque converter may be engaged and fuel may be cut. With this arrangement, the momentum of the motor vehicle can be maintained through the use of the lock-up clutch.

Referring to FIG. 9, motor vehicle 100 is initially accelerated to a desired velocity by a driver. At this point, fuel injector set 170 is operating normally. Likewise, throttle 130 is partially opened. Also, the engine speed is operating at approximately 3200 RPM, according to engine speed sensor 124.

Referring to FIG. 10, motor vehicle 100 may undergo a predetermined engine event, such as fuel cut deceleration. In some cases, during fuel cut deceleration, fuel injector set 170 prevents fuel from entering a cylinder of the engine. Also, in some cases, a lock-up clutch can be engaged within a torque converter of the motor vehicle (not shown). This allows momentum from the wheels to be transferred directly to the engine.

In some cases, during fuel cut deceleration, an ECU can be configured to run a diagnostic routine. Generally, any type of diagnostic routine can be run during the fuel cut deceleration. In an embodiment, the ECU may run a diagnostic routine to determine an ambient pressure correction factor for the ambient pressure value.

In different embodiments, the ECU may receive information from various sensors to determine an ambient pressure correction factor. In some cases, the ECU can receive information from an intake pressure sensor, an air temperature sensor, a coolant temperature sensor, an engine speed sensor, a fuel tank pressure sensor and/or a throttle angle sensor. In other cases, the ECU can retrieve information from other sensors. In one embodiment, the ECU can retrieve information from an engine speed sensor and an intake pressure sensor.

In some embodiments, the ECU can be configured to control throttle 130 during the predetermined engine event. In some cases, the ECU may be configured to open throttle 130 to a predetermined position. Generally, throttle 130 can be opened to any position between fully opened and fully closed. For example, in one embodiment throttle 130 can be controlled to open to a position that is six-eighths fully open. In another embodiment, throttle 130 can be controlled to open to a position that is halfway between fully closed and fully open. In another embodiment, throttle 130 can be controlled to open to a position that is one-fourth fully open. In this embodiment throttle 130 may be opened to a wide open throttle position, as seen in FIG. 10.

In some embodiments, ECU 120 can control throttle 130 using a drive-by-wire system. In other embodiments, ECU 120 can control throttle 130 using any other method known in the art. In still other embodiments, ECU 120 may not control throttle 130 and instead may wait until throttle 130 is in a predetermined position to run a diagnostic routine.

In this embodiment, ECU 120 can be configured to monitor engine speed sensor 124 and intake pressure sensor 121. As indicated by engine speed sensor 124, the engine speed has decreased slightly to approximately 3000 RPM during fuel cut deceleration. As fuel cut deceleration continues, the engine speed may continue lowering. At a later time, illustrated in FIG. 11, the engine speed has decreased to approximately 1500 RPM.

In some embodiments, the pressure of the intake manifold, as measured using intake pressure sensor 121, may change as the engine speed changes during fuel cut deceleration. Referring to FIGS. 10 and 11, intake pressure sensor 121 indicates that the pressure has changed as the engine speed changes.

Figure 12:
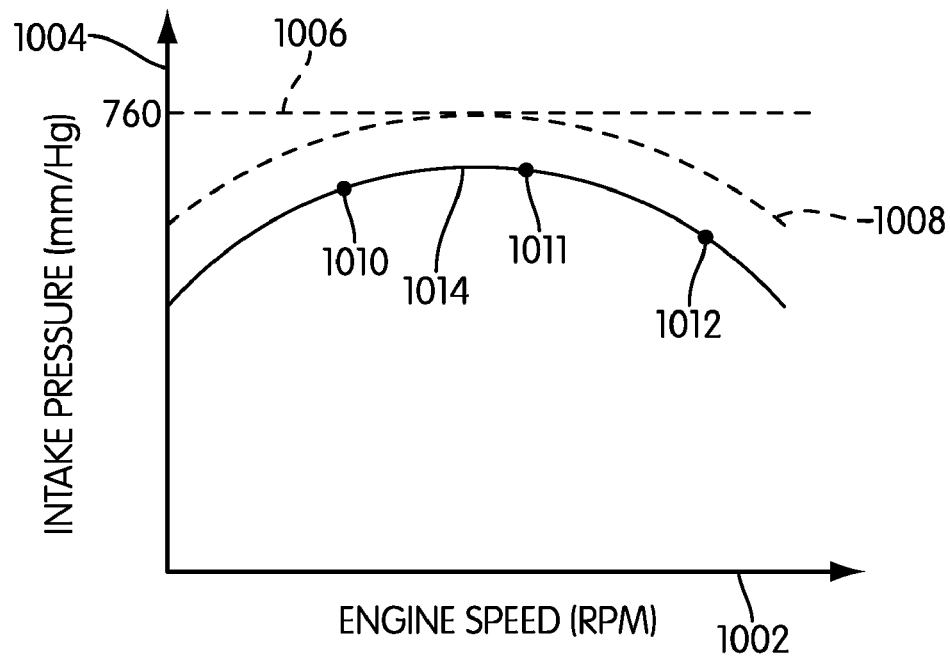
FIG. 12 is an embodiment of a relationship between engine speed and intake pressure at a wide open throttle.
Figure 13:
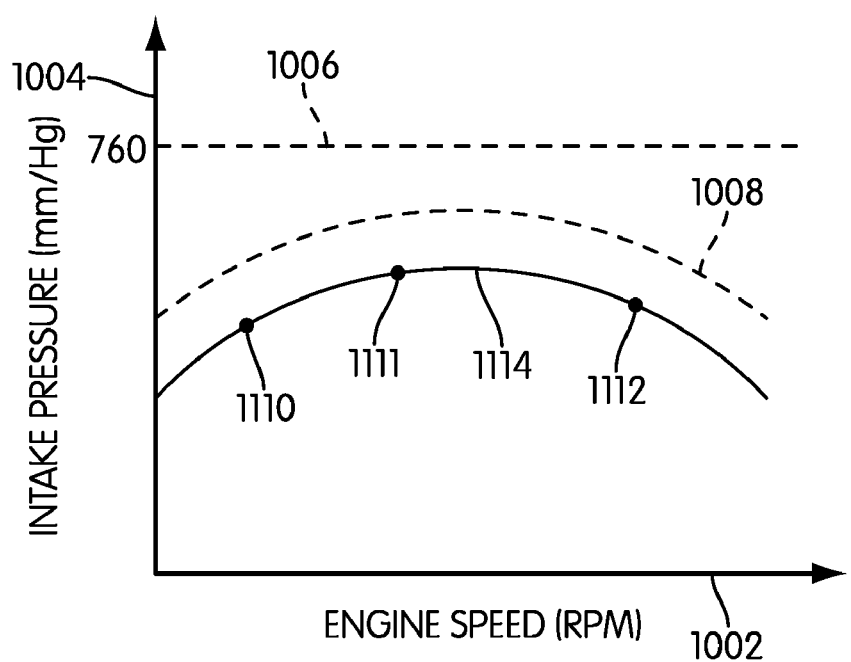
FIG. 13 is an embodiment of a relationship between engine speed and intake pressure at half open throttle.

FIGS. 12 and 13 illustrate embodiments of a relationship between engine speed and intake manifold pressure at constant throttle angle. In particular, FIGS. 12 and 13 include intake pressure 1004 axis and engine speed axis 1002. In this embodiment, the illustrated throttle angle curves refer to measurements made between intake pressure and engine speed while holding a throttle angle constant. In other words, any two points on the same throttle angle curve correspond to measurements made at the same throttle angle positions. For purposes of clarity, reference curve 1006, corresponding to an intake pressure value of 760 mmHg is provided in FIGS. 12 and 13.

Curve 1008 represents a predetermined relationship between engine speed and intake pressure at a wide open throttle position. In some cases, curve 1008 may represent the relationship between engine speed and intake pressure for a first engine state. The term "first engine state" as used throughout this detailed description and in the Figures refers to an engine state associated with a previous condition of the engine. In some cases, the first engine state could be the initial state of the engine immediately following manufacturing. In other cases, the first engine state could be the state of the engine during an initial period of operation. For example, in some cases, the relationship between intake pressure and engine speed at a particular throttle angle could be measured during some predetermined time period, such as the first few months of use of the motor vehicle. The values of the engine parameters at this point could be stored in order to compare these values with measurements taken at a later time. It should be understood that in some cases, curve 1008 can be a measured curve; however, in other cases, curve 1008 can be an ideal curve that is calculated rather than empirically measured.

Curve 1014 represents the relationship between intake pressure and engine speed at wide open throttle as measured during a second engine state. The term "second engine state" as used throughout this detailed description and in the claims refers to a state of the engine that occurs after the first engine state. In this embodiment, curve 1014 is determined according to a plurality of discrete measurements. In particular, first curve 1014 may comprise first measurement 1010, second measurement 1011 and third measurement 1012. For purposes of clarity, only three points are illustrated in this embodiment. However, in other embodiments, curve 1014 can comprise any number of points representing simultaneous measurements of intake pressure and engine speed at wide open throttle.

As seen in FIG. 12, curve 1014 is not coincident with curve 1008. In other words, the relationship between intake pressure and engine speed is different for the first engine state and the second engine state. In some cases, the difference between curve 1014 and curve 1008 can be used to characterize the change in the engine state. Moreover, the difference between curve 1014 and curve 1008 can be used to determine an ambient pressure correction factor.

Generally, the ambient pressure correction factor can be used to determine a corrected ambient pressure value in different ways. In some cases, the ambient pressure correction factor can be multiplied with the ambient pressure value to acquire the corrected ambient pressure value. In other cases, the ambient pressure correction factor can be used to modify an equation that is used for determining an ambient pressure value. In still other cases, the ambient pressure correction value can be used to modify a look-up table that is used for determining an ambient pressure value.

FIG. 13 illustrates another embodiment of a relationship between engine speed and intake manifold pressure at constant throttle angle. In this embodiment, the throttle is disposed in a position halfway between the open and closed positions. In this case, curve 1108 is associated with a first engine state, while curve 1114 is associated with a second engine state. Furthermore, curve 1114 comprises first measurement 1110, second measurement 1111 and third measurement 1112. Because curve 1108 is associated with measurements taken at halfway open throttle positions, curve 1108 is offset from curve 1008 in FIG. 12.

The difference between curve 1108 and curve 1114 can be used to determine a corrected ambient pressure value in a similar manner to the method discussed for determining a corrected ambient pressure value when the throttle is set to a fully open position. Furthermore, in other embodiments, the same method for determining a corrected ambient pressure value could be used for other throttle angle curves.

In some embodiments, a diagnostic routine configured to determine a correction factor for an ambient pressure value can use information from multiple throttle angle curves. In some cases, using multiple throttle angle curves may facilitate the determination of more accurate correction factors.

Figure 14:
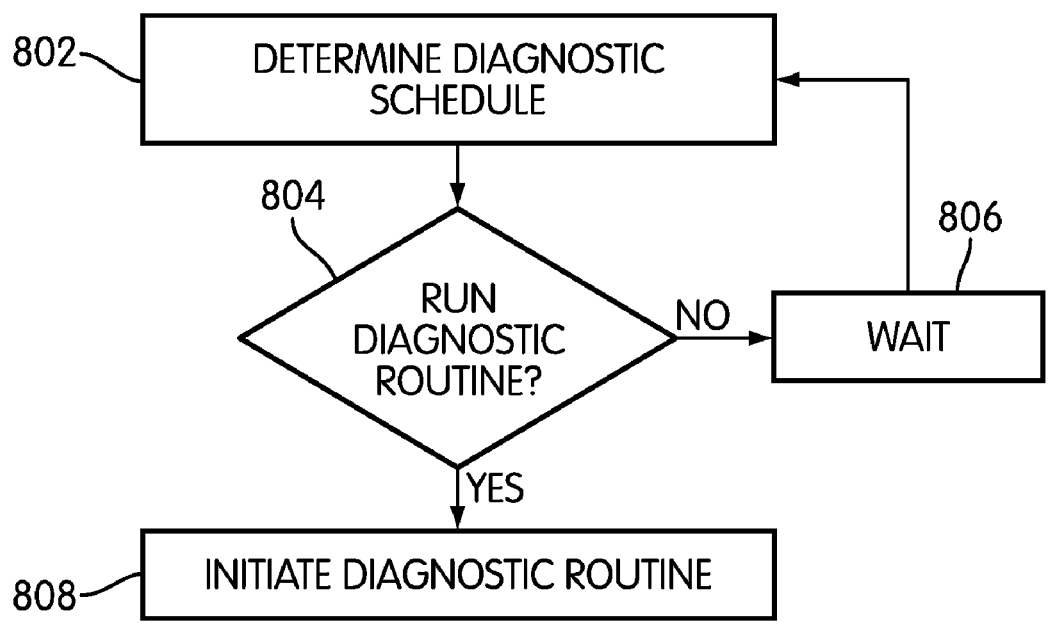
FIG. 14 is an embodiment of a process for initiating a diagnostic routine.

FIG. 14 illustrates an embodiment of a process of running a diagnostic routine. Initially, during step 802, the ECU may determine a diagnostic schedule. The diagnostic schedule can be stored in a database associated with the ECU in some cases. In different embodiments, the diagnostic schedule can vary. In some cases, the diagnostic schedule may require a diagnostic routine to be run on a monthly basis. In other cases, the diagnostic schedule may require a diagnostic routine to be run every six months. In still other cases, the diagnostic schedule may require the diagnostic routine to be run after a predetermined number of engine on events. For example, in one embodiment, a diagnostic routine may be required after an engine has been turned on 100 times since the last diagnostic routine was run.

Following step 802, the ECU may proceed to step 804. During step 804, the ECU may determine if a diagnostic routine should be run. For example, in one embodiment, if the diagnostic schedule requires the diagnostic routine to be run on the first day of every month, the ECU may determine if the current date is the first day of the month. If, during step 804 the ECU determines that the diagnostic routine should not be run, then the ECU may proceed to step 806. During step 806 the ECU may wait and then return to step 802. If, during step 804, the ECU determines that the diagnostic routine should be run, then the ECU may proceed to step 808. During step 808, the ECU may initiate the diagnostic routine.

Figure 15:
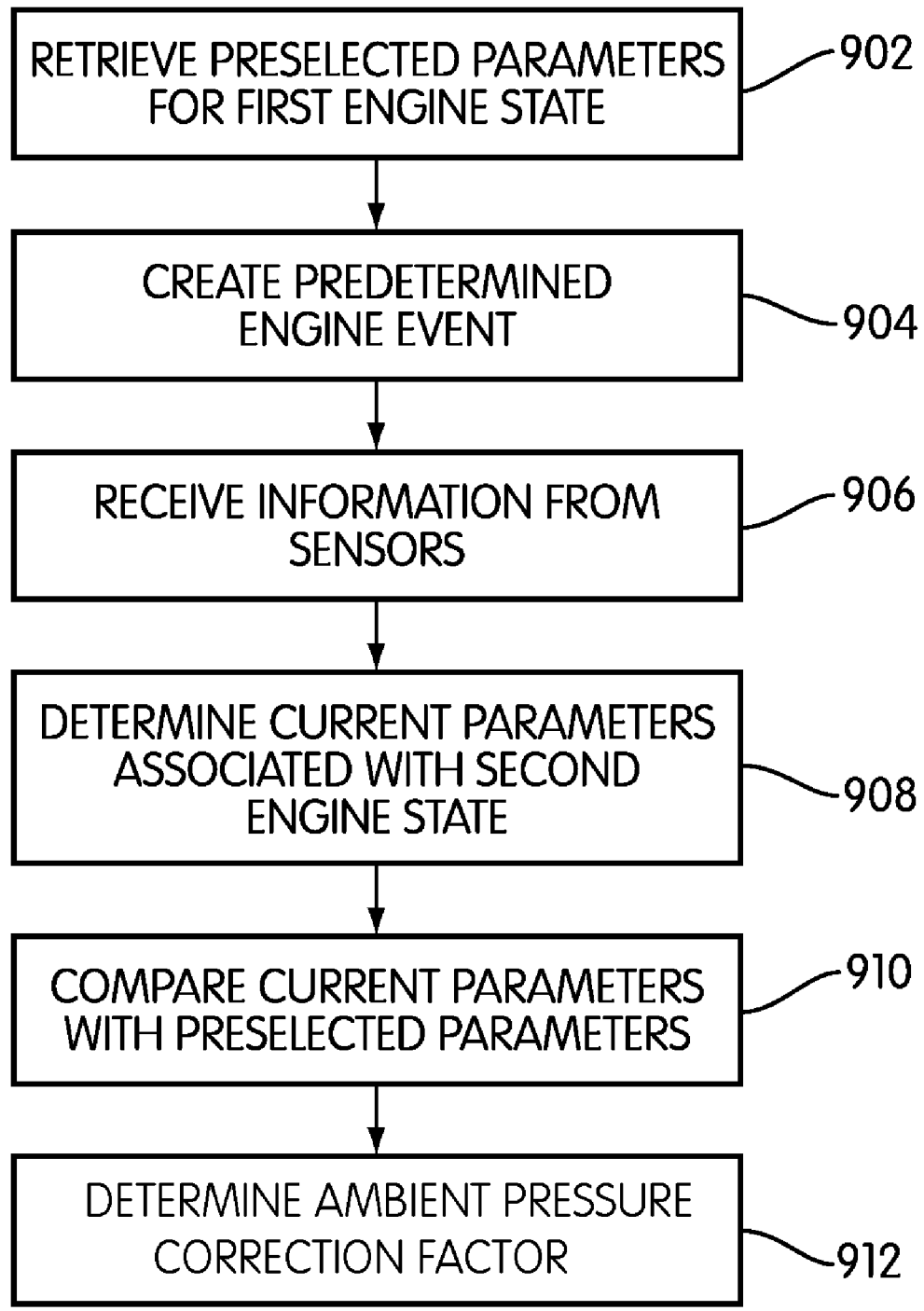
FIG. 15 is an embodiment of a process for determining an ambient pressure correction factor.

FIG. 15 illustrates an embodiment of a diagnostic routine for determining a correction factor for an ambient pressure value. During step 902, the ECU can retrieve one or more preselected parameters that are associated with a first engine state. In one embodiment, as previously discussed, the ECU may retrieve a predetermined relationship between engine speed and intake pressure at a particular throttle angle. For example, in one embodiment, the ECU could retrieve a curve of intake pressure as a function of engine speed for a predetermined throttle angle, as illustrated in FIGS. 12 and 13. In other embodiments, however, the ECU can retrieve other preselected parameters associated with the first engine state.

Following step 902, the ECU may proceed to step 904. During step 904, the ECU may create a predetermined engine event. In one embodiment, as previously discussed, the ECU may initiate a fuel cut deceleration event. Furthermore, during fuel cut deceleration, the ECU could open the throttle to a wide open position in order to monitor various engine parameters at wide open throttle. In some cases, this may require the engine to override normal operating conditions. In particular, during deceleration fuel cut, the throttle is often closed. However, in order to measure engine speed and intake pressure at wide open throttle, the ECU can override the normal throttle control in order to fully open the throttle. In some cases, this can be achieved using a drive-by-wire system to automatically control the throttle.

Following step 904, the ECU can proceed to step 906. During step 906, the ECU can receive information from one or more sensors. In one embodiment, the ECU can receive information from the intake pressure sensor and the engine speed sensor. At this point, the ECU can proceed to step 908. During step 908, the ECU can determine current parameters associated with the second engine state. In other words, the ECU can make real-time measurements of one or more parameters.

Following step 908, the ECU can proceed to step 910. During step 910 the ECU can compare the current parameters with the preselected parameters, which are associated with the second engine state and the first engine state, respectively. Finally, during step 912, the ECU can determine an ambient pressure correction factor that can be used to adjust any ambient pressure values.

In another embodiment, the ECU may be configured to passively monitor the engine in order to determine an ambient pressure correction factor. In other words, the ECU can determine an ambient pressure correction factor without creating or initiating a predetermined engine event. Instead, the engine may use information that is already monitored during normal engine operation for determining an ambient pressure correction value.

Figure 16:
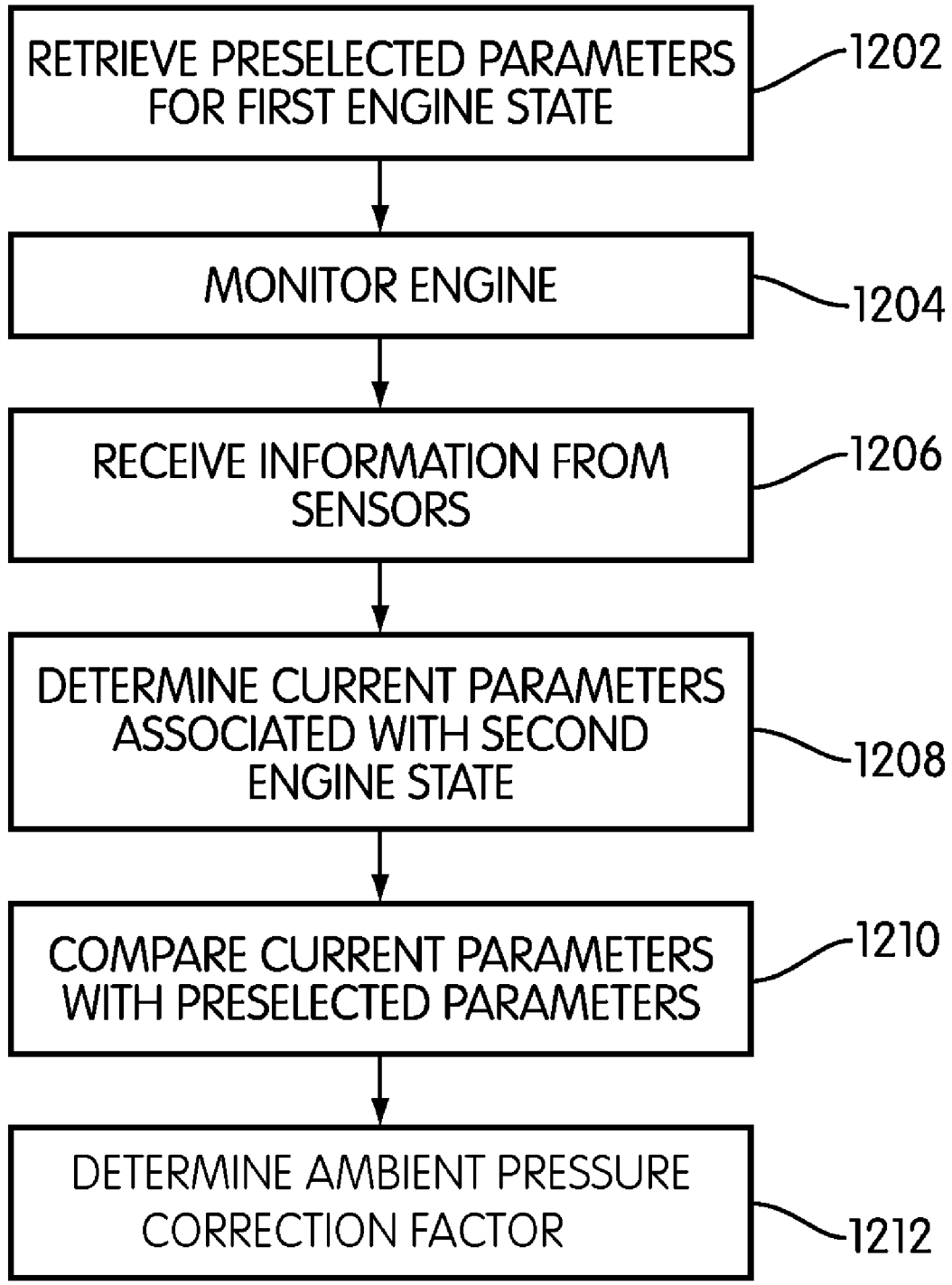
FIG. 16 is an embodiment of a process for determining an ambient pressure correction factor.

FIG. 16 illustrates an embodiment of a diagnostic routine for determining a correction factor for an ambient pressure value. During step 1202, the ECU can retrieve one or more preselected parameters that are associated with a first engine state. In one embodiment, the preselected parameters can be associated with engine air leakage. Over time, various factors can lead to increased air leakage in an engine, which can affect various other operating parameters such as intake pressure, engine speed as well as other parameters. In some cases, a motor vehicle can include systems for monitoring air leakage, which may also be referred to as idle air amount for parasitic losses. In some embodiments, the first engine state may be associated with a preselected air leakage parameter that characterizes the amount of air leakage for the first engine state.

Following step 1202, the ECU can be configured to proceed to step 1204. During step 1204, the ECU may monitor the operating state of the engine. In particular, the ECU may continue monitoring one or more sensors that are used to determine air leakage. At this point, the ECU can receive information from one or more sensors during step 1206. In different embodiments, different sensors may be configured for use in determining an air leakage value.

Following step 1206, the ECU can proceed to step 1208. During step 1208, the ECU may determine current parameters associated with a second engine state. In some cases, the ECU can determine an air leakage value according to information received from one or more sensors associated with air leakage.

Following step 1208, the ECU can proceed to step 1210. During step 1210, the ECU may compare the current engine parameters with the preselected engine parameters. For example, in some cases the ECU may compare a measured air leakage value with a preselected leakage value. Finally, during step 1212, the ECU can use the air leakage value to determine an ambient pressure correction factor. At this point the ambient pressure correction factor can be used to determine a corrected ambient pressure value, which can be used to control fuel injection.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of controlling a motor vehicle, comprising the steps of:
    determining if a fuel tank is in equilibrium with an environment of the motor vehicle;
    receiving information from a fuel tank pressure sensor when the fuel tank is in equilibrium with the environment;
    determining an ambient pressure value from the information received from the fuel tank pressure sensor;
    receiving information from an intake pressure sensor;
    adjusting the ambient pressure value according to the information received by the intake pressure sensor; and
    controlling one or more systems of the motor vehicle according to the ambient pressure value.

2. The method according to claim 1, wherein the step of determining if the fuel tank is in equilibrium with the environment includes a step of determining if a vent shut valve is open.

3. The method according to claim 1, wherein the step of determining if the fuel tank is in equilibrium with the environment includes a step of determining if an engine of the motor vehicle is running.

4. The method according to claim 1, wherein the method further includes a step of storing the ambient pressure value in a memory.

5. The method according to claim 1 wherein the the fuel injection system is controlled according to the ambient pressure value.

6. A method of controlling a motor vehicle, comprising the steps of:
  determining an ambient pressure value, the ambient pressure value being used to control at least one system of the motor vehicle;
  retrieving a preselected parameter associated with a first engine state, wherein the first engine state corresponds to a period of time related to a first operation of the engine;
  receiving information from at least one sensor;
  determining a current parameter associated with a second engine state according to information received from the at least one sensor, wherein the second engine state is different from the first engine state and occurs at a later time after the period of time related to the first operation of the engine;
  comparing the current parameter with the preselected parameter;
  determining an ambient pressure correction factor based on the comparison between the preselected parameter and the current parameter; and
  using the ambient pressure correction factor to adjust the ambient pressure value.

7. The method according to claim 6, wherein the step of receiving information from a sensor is preceded by a step of creating a predetermined engine event.

8. The method according to claim 7, wherein the predetermined engine event is a fuel cut deceleration event.

9. The method according to claim 6, wherein the at least one sensor includes an intake pressure sensor and an engine speed sensor.

10. The method according to claim 6, wherein the first engine state corresponds to the period of time when the engine was first manufactured.

11. The method according to claim 6, wherein the at least one sensor is configured to determine an air leakage value.

12. The method according to claim 11, wherein the air leakage value is an idle amount for parasitic losses.

13. The method according to claim 6, wherein the first engine state corresponds to a second period of time related to a first few months of use of the engine.

14. A method of controlling a motor vehicle, comprising the steps of:
  determining if an engine of the motor vehicle is running;
  receiving information from a plurality of sensors when the engine is running, wherein the plurality of sensors includes a coolant temperature sensor, an intake pressure sensor, and a fuel tank pressure sensor;
  determining an ambient pressure value according to the information received from the plurality of sensors; and
  controlling a fuel injection system according to the ambient pressure value.

15. The method according to claim 14, wherein the plurality of sensors further includes a throttle angle sensor, and an engine speed sensor.

16. The method according to claim 15, wherein the plurality of sensors further includes an air temperature sensor.

17. The method according to claim 14, wherein the method includes a step of determining the ambient pressure value directly from information received from the intake pressure sensor when the engine is not running.

18. The method according to claim 14, wherein the method includes a step of determining the ambient pressure value directly from information received from the fuel tank pressure sensor when the engine is not running.

19. The method according to claim 14, wherein the ambient pressure value is determined using a look-up table.

20. The method according to claim 14, wherein the ambient pressure value is calculated using a function.

* * * * *